Oct. 19, 1954
V. DUQUESNE
2,692,013
POWER-ACTUATED TIRE REMOVING APPARATUS
WITH CIRCUMFERENTIALLY DISTRIBUTED
THRUST MEMBERS
Filed July 26, 1950
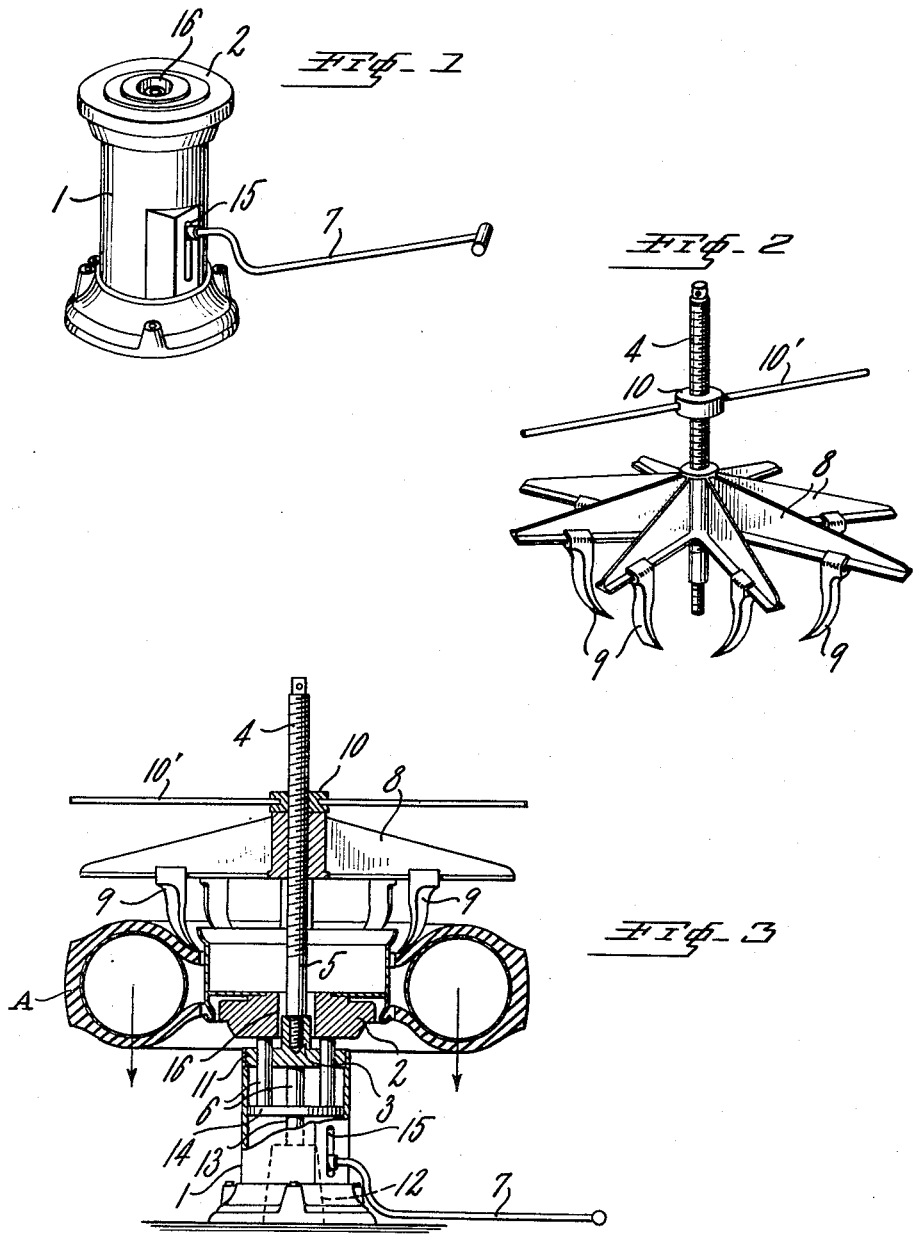
INVENTOR.
VICTOR DUQUESNE
BY
AGT.

Patented Oct. 19, 1954

2,692,013

UNITED STATES PATENT OFFICE 2,692,013

POWER-ACTUATED TIRE REMOVING APPARATUS WITH CIRCUMFERENTIALLY DISTRIBUTED THRUST MEMBERS

Victor Duquesne, Antwerp, Belgium

Application July 26, 1950, Serial No. 176,023

Claims priority, application Belgium February 11, 1950

1 Claim. (Cl. 157—1.2)

The present invention relates to an apparatus for removing tires from rims of vehicle wheels. An object of the present invention is to construct an apparatus for removing tires, with considerable rapidity and a minimum of effort, from motor vehicle wheels. Until now, for detaching or dislodging a tire, it has been necessary to use a flat chisel and a hammer in conjunction with presses of special construction.

Another object of the present invention is to provide a tire removing apparatus in which it is no longer necessary to block the wheel and in which counteracting effects are produced upon the tire and the wheel body, so as to obtain the separation of tire and wheel body, under the effect of forces which are distributed circumferentially and directed substantially parallel to the axis of the wheel.

The tire removing apparatus according to the invention comprises a base supporting a plate which is axially movable and intended to freely support the wheel body, a removable device adapted to be axially assembled with the base in contact with the tire, preferably the tire bead, and pressure means, preferably hydraulic pressure means, for operating the axial displacement of said plate opposite to the removable device contacting the tire, the removable device being prevented from following the movement of the plate. The aforesaid structure provides counteracting forces operating respectively upon the wheel body and upon the tire, separating them by a sliding motion.

The apparatus of the present invention provides that the counteracting forces are produced parallel to a common axis, which is preferably that of the apparatus itself; said forces preferably being in the vertical direction.

In a preferred form of the apparatus according to the present invention, the base part will be a fixed hollow column, which forms a lodging for the pressure means, for instance a small hydraulic jack to be exteriorly operated in a known manner by means of a reciprocating lever. A movable plate or disc is centered and guided in said base and moved by said jack; this plate sustains the wheel body when the tire is to be removed. The removable reacting device is a spider fitted with radially regulable claws, said spider being assembled with the base part by means of a central stem. This central stem and the spider, the movable plate and its guiding means, the base part and the pressure means will preferably have a common axis.

The above and still further objects of the present invention will be apparent upon consulting the specification in conjunction with the drawings, wherein:

Figure 1 is a perspective view of the base part with its movable plate in neutral position, Figure 2 is a perspective view of the removable device for counteracting the movement of the moving plate; and, Figure 3 is a complete view of the tire removing apparatus in operation, shown in axial section, a part of the base being shown in elevation.

Referring now with particularity to the drawing base part 1 is in the shape of a hollow column which may be bolted to the ground and is closed at the top by a screwing cover 11. Inside the column 1 is axially fixed a hydraulic jack 12 of known construction which is to be actuated exteriorly of the column 1 by a swinging lever 7 traversing the elongated slot 15 of the column. The lifting stem 13 of the jack supports a disc 14 which is axially guided inside the column 1. The disc 14 carries three upwardly directed cylindrical bars 6 which are parallel to the lifting stem 13 and traversing the cover 11 through guiding bores. Secured to the exteriorly projecting ends of the bars 6 is a sustaining plate 2 which is in the shape of a disc and is provided on its upper face with circular concentric steps, corresponding to the usual circular bores of the different wheel bodies; in this way, a wheel body may be directly centered upon the plate, abutting the step which conforms to and fits the central bore of the particular wheel body.

The sustaining plate 2 has a central bore 16 of convenient section for passage therethrough of the central stud 3 which projects upwardly from the cover 11. Projecting through the bore 16 is a threaded stem 4, has its lower end threaded into a corresponding tapped bore of the stud 3. The threaded stem 4 has a smooth portion 5 at the level of the bore of the particular wheel body placed on the disc plate 2. Mounted on the stem 4 is a spider having eight arms 8, the spider being freely slidable with its hub upon the stem 4. The spider arms have substantially horizontal webs upon which claws 9 are slidable. The spatulate lower end of each of the claws is substantially in a horizontal direction and can be selectively engaged with the bead of the tire A close to the wheel rim. A nut 10 provided with driving arms 10' screws downwardly on the threaded stem 4 into a position in contact with the hub of the spider.

From the foregoing the operation of the present apparatus should be readily understood. The claw supporting spider 8—9 with its stem 4 and nut 10 is put aside, whereupon the wheel body with its tire can be simply placed upon the plate 2, the bore of the wheel engaging the convenient step. The stem 4 bearing the spider is screwed into the stud 3 and the nut 10 lowered into contact with the spider hub and thereafter the hydraulic jack is actuated by means of the swinging lever 7. Accordingly, the sustaining plate is moving upwardly while the spider is maintained against upward displacement by the nut 10. The aforesaid operation results in counteracting forces operating respectively upon the wheel body and upon the tire, the latter being separated progressively by sliding in opposite directions.

It can thus be seen that there has been provided in accordance with the present invention an apparatus for removing a tire from a wheel rim comprising a base in the shape of a fixed cylindrical column having a solid bottom part and a cover part obstructing the top end opening of the base, said cover having a central upwardly directed extension provided with an axial threaded bore, a hydraulic jack supported upon the bottom of the base, and a foot actuated operating lever for said jack traversing the side wall of the base through an elongated slot.

The apparatus further includes a disc slidable inside said base and driven by the said jack and guided along the inner side of the base wall, a plurality of bars projecting upwardly from said disc and traversing the cover through guiding bores, a sustaining plate arranged exteriorly of said column and secured to the adjacent ends of said bars, said sustaining plate having a plurality of concentric steps in axial arrangement and conformably receivable within the standard central openings of wheel bodies for centering purposes, said sustaining plate having a central passage engaged by said extension of said cover, a threaded bar axially screwing into said extension, a spider having radial arms of inverted T-section and slidable along said threaded bar, radially adjustable S-shaped integral iron members slidable along said spider arms and adapted to engage the tire bead contiguous to the wheel rim, a nut movable along said threaded bar for axially moving said spider, said nut having means for manual operation, said base, jack, cover, sustaining plate, threaded bar and spider having a common geometrical axis, whereby upon simultaneous actuation of said operating lever and of said manual means, said sustaining plate and said wheel rim carried thereby are displaced in one direction, whereas said spider is slid along said threaded bar in the opposite direction to thereby prevent displacement of said tire in said one direction due to the engagement of the latter with said iron members and to further remove said tire from said wheel rim by moving said tire in the direction opposite to that in which said wheel rim is displaced.

Having thus described the invention, what is claimed as new and desired to be secured by Letters Patent, is:

An apparatus for removing a tire from a wheel rim comprising a base in the shape of a fixed cylindrical column having a solid bottom part and a cover part obstructing the top end opening of the base, said cover having a central upwardly directed extension provided with an axial threaded bore, a hydraulic jack supported upon the bottom of the base, a foot actuated operating lever for said jack traversing the side wall of the base through an enlongated slot, a disc slidable inside said base and driven by the said jack and guided along the inner side of the base wall, a plurality of bars projecting upwardly from said disc and traversing the cover through guiding bores, a sustaining plate arranged exteriorly of said column and secured to the adjacent ends of said bars, said sustaining plate having a plurality of concentric steps in axial arrangement and conformably receivable within the standard central openings of wheel bodies for centering purposes, said sustaining plate having a central passage engaged by said extension of said cover, a threaded bar axially screwing into said extension, a spider having radial arms of inverted T-section and slidable along said threaded bar, radially adjustable S-shaped integral iron members slidable along said spider arms and adapted to engage the tire bead contiguous to the wheel rim, a nut movable along said threaded bar for axially moving said spider, said nut having means for manual operation, said base, jack, cover, sustaining plate, threaded bar and spider having a common geometrical axis, whereby upon simultaneous actuation of said operating lever and of said manual means, said sustaining plate and said wheel rim carried thereby are displaced in one direction, whereas said spider is slid along said threaded bar in the opposite direction to thereby prevent displacement of said tire in said one direction due to the engagement of the latter with said iron members and to further remove said tire from said wheel rim by moving said tire in the direction opposite to that in which said wheel rim is displaced.

References Cited in the file of this patent

UNITED STATES PATENTS

| Number | Name | Date |
| --- | --- | --- |
| 1,352,722 | Caldwell | Sept. 14, 1920 |
| 1,724,813 | Weaver et al. | Aug. 13, 1929 |
| 1,742,590 | Freivogel | Jan. 7, 1930 |
| 2,345,346 | Larson | Mar. 28, 1944 |
| 2,375,596 | Smith et al. | May 15, 1945 |
| 2,436,003 | Gosselin | Feb. 17, 1948 |
| 2,446,963 | Stolz | Aug. 10, 1948 |
| 2,449,289 | Garey | Sept. 14, 1948 |
| 2,464,638 | Falkner | Mar. 15, 1949 |
| 2,479,432 | Tillotson | Aug. 16, 1949 |
| 2,495,118 | McCollister | Jan. 17, 1950 |
| 2,551,994 | Bloodworth | May 8, 1951 |

FOREIGN PATENTS

| Number | Country | Date |
| --- | --- | --- |
| 163,712 | Austria | Aug. 10, 1949 |